(12) United States Patent
Ekholm et al.

(10) Patent No.: US 9,233,818 B2
(45) Date of Patent: Jan. 12, 2016

(54) MONITORING OF BRAKE

(71) Applicant: KONECRANES PLC, Hyvinkää (FI)

(72) Inventors: Niko Ekholm, Hyvinkää (FI); Aapo Jantunen, Hyvinkää (FI); Johanna Kirjavainen, Tampere (FI); Juha Toikka, Lappeenranta (FI); Risto Vilppo, Hyvinkää (FI)

(73) Assignee: KONECRANES PLC, Hyvinkää (FI)

( * ) Notice: Subject to any disclaimer, the term of this patent is extended or adjusted under 35 U.S.C. 154(b) by 0 days.

(21) Appl. No.: 14/379,464

(22) PCT Filed: Feb. 15, 2013

(86) PCT No.: PCT/FI2013/050183
§ 371 (c)(1),
(2) Date: Aug. 18, 2014

(87) PCT Pub. No.: WO2013/124538
PCT Pub. Date: Aug. 29, 2013

(65) Prior Publication Data
US 2015/0047426 A1    Feb. 19, 2015

(30) Foreign Application Priority Data

Feb. 20, 2012    (FI) .................................... 20125194

(51) Int. Cl.
*B66D 5/02* (2006.01)
*B66D 5/30* (2006.01)
(Continued)

(52) U.S. Cl.
CPC . *B66D 5/02* (2013.01); *B60T 17/18* (2013.01); *B66D 1/54* (2013.01); *B66D 5/14* (2013.01);
(Continued)

(58) Field of Classification Search
CPC ................ B60T 13/748; B60T 17/221; B60T 2270/406; B60T 17/18; B66B 1/32; B66B 5/0031; F16D 65/14; F16D 49/00; F16D 63/002; F16D 66/00; B66D 1/54; B66D 5/02; B66D 5/24
See application file for complete search history.

(56) References Cited

U.S. PATENT DOCUMENTS

| 6,401,875 | B1* | 6/2002 | Marvin | H02P 21/146 187/393 |
| 7,549,513 | B2* | 6/2009 | Chida | B66B 5/0031 187/248 |
| 8,727,075 | B2* | 5/2014 | Huppunen | B60T 8/885 187/288 |
| 9,046,142 | B2* | 6/2015 | Kattainen | H02P 3/04 1/1 |
| 2011/0198167 | A1 | 8/2011 | Huppunen et al. | |

FOREIGN PATENT DOCUMENTS

DE    4444234 A1    6/1996
FI    117597 B    12/2006
(Continued)

*Primary Examiner* — Freddie Kirkland, III
(74) *Attorney, Agent, or Firm* — Birch, Stewart, Kolasch & Birch, LLP

(57) ABSTRACT

The monitoring of a brake is disclosed. The brake includes first and second braking surfaces and a magnetizing device arranged to move the braking surfaces to an open state, in which the braking surfaces are separated from each other, and to a closed state, in which the braking surfaces are connected to each other. During the monitoring of the brake, the time is measured that elapses from the change in the magnetic field caused by the magnetizing device to the shift of the braking surfaces from one state to another.

27 Claims, 9 Drawing Sheets

(51) Int. Cl.
*H02P 15/00* (2006.01)
*B66D 5/14* (2006.01)
*B60T 17/18* (2006.01)
*B66D 1/54* (2006.01)
*B66D 5/24* (2006.01)
*F16D 66/00* (2006.01)
*G01L 5/28* (2006.01)
*H02K 7/102* (2006.01)

(52) U.S. Cl.
CPC .. *B66D 5/24* (2013.01); *B66D 5/30* (2013.01); *F16D 66/00* (2013.01); *G01L 5/28* (2013.01); *H02P 15/00* (2013.01); *F16D 2066/006* (2013.01); *H02K 7/1025* (2013.01)

(56) References Cited

FOREIGN PATENT DOCUMENTS

| | | |
|---|---|---|
| FI | 120986 B | 5/2010 |
| JP | 8-42613 A | 2/1996 |
| JP | 2008-168981 A | 7/2008 |
| JP | 2011-46493 A | 3/2011 |
| WO | WO 00/20320 A1 | 4/2000 |
| WO | WO 03/032479 A1 | 4/2003 |
| WO | WO 2009/024168 A1 | 2/2009 |

\* cited by examiner

MONITORING OF BRAKE

FIELD OF THE INVENTION

The present invention relates to the monitoring of a brake and in particular to monitoring an electromagnetic disc brake.

BACKGROUND

Brakes used in hoisting devices are critical to the operation of the hoisting device both in terms of economy and safety. The malfunction of a brake may lead to dropping the load, whereby other parts of the hoisting device may be damaged and there is a risk that the persons working close by will get hurt.

Brakes used in hoisting devices are conventional disc brakes, in which disc-like friction material rotating along with the motor axle presses against an anchor plate and deceleration takes place.

The friction surface wears during deceleration. If the friction surface wears out, the braking effect of the brake decreases significantly and the brake can no longer operate as designed. Thus, the brake malfunctions.

The condition of a brake is typically monitored manually by measuring the thickness of the friction surface with a slide gauge. So as to be able to measure the friction surface, a possible brake casing thus needs to be dismantled, and after the measurement and the possibly required brake maintenance, the casing needs to be closed again. Brake monitoring thus entails manual labour that is time-consuming and subject to errors. In addition, in hoisting devices, in which the brake is high up, as in harbour cranes, there is a risk that the maintenance person may fall and taking this into account may further add to the time required to perform maintenance.

During the checking of the brake of the hoisting device, the production machine to which the brake is mounted is not available for use for its conventional work. A harbour crane under brake maintenance, for instance, is then out of use during the checking of the brake. However, in terms of economy, the downtime of an expensive apparatus like a harbour crane should be kept as rare and short as possible. Therefore, it is desirable that breaks in the operation of production machines are as short as possible. By scheduling the production breaks, it is possible to shorten the downtime, as the maintenance work can be planned better.

In terms of safety, the wear of a hoisting device brake causes a risk by increasing the probability of the malfunction of the brake, which may cause economic losses, if the hoisting device or its parts break or people in the vicinity of the hoisting device are hurt or damage is caused to the production line or other property. For example, if the brake does not close, the load of the hoisting device may fall. Also, if the brake does not close, the motor of the hoisting device may run against the brake and the brake may overheat and even explode.

BRIEF DESCRIPTION OF THE INVENTION

The following is a simplified summary of the invention to provide basic understanding of some aspects of the invention. This summary is not an extensive description of the invention and is not intended to identify the important/critical elements of the invention or to define the scope of the invention. Its only intention is to present some concepts of the invention in a simplified form as an introduction to a more detailed description that follows.

It is an object of the present invention to develop a solution to alleviate the above-mentioned drawbacks. The object of the invention is achieved by devices, methods and a computer program product that are characterised by what is stated in the attached independent claims. Preferred embodiments of the invention are disclosed in the dependent claims.

According to an aspect of the invention, a method is arranged for monitoring a brake, the brake comprising first and second braking surfaces and magnetizing means arranged to move the braking surfaces to an open space, where the braking surfaces are not connected to each other, and a closed space, where the braking surfaces are connected to each other.

According to a second aspect of the invention, a method is arranged for monitoring a brake, the brake comprising first and second braking surfaces and magnetizing means arranged to move the braking surfaces to an open state, where the braking surfaces are not connected to each other, and a closed state, where the braking surfaces are connected to each other, the method measuring time from the change in the magnetic field generated by the magnetizing means to the transfer of the braking surfaces from one state to another.

According to another aspect of the invention, a device is arranged for monitoring an electromagnetic brake, the brake comprising first and second braking surfaces being movable between an open state opened by means of a magnetic field of the brake, where the braking surfaces are not connected to each other, and a closed state, where the braking surfaces are connected to each other, the device comprising receiving means for receiving energy from the magnetic field of the brake, and the device being arranged to measure time from the change in the magnetic field generated by the magnetizing means to the transfer of the braking surfaces from one state to another.

According to another aspect of the invention, a device is arranged comprising means arranged to perform a method according to an aspect.

According to another aspect of the invention, a computer program product is arranged comprising program instructions to make a device execute a method according to an aspect after downloading into the device.

According to another aspect of the invention, an electromagnetic brake is arranged comprising a device according to an aspect.

According to another aspect of the invention, a hoisting device is arranged comprising an electromagnetic brake according to an aspect.

According to another aspect of the invention, a method is arranged for upgrading a hoisting device that comprises an electromagnetic brake with first and second braking surfaces being movable between an open state opened by means of a magnetic field of the brake, where the braking surfaces are not connected to each other, and a closed state, where the braking surfaces are connected to each other, the method measuring time from the change in the magnetic field generated by the magnetizing means to the transfer of the braking surfaces from one state to another.

Some aspects of the invention enable the monitoring of the condition of the electromagnetic brake without connecting to the control system of the brake.

Some aspects of the invention enable the monitoring of the condition of the electromagnetic brake from outside the brake casing.

Some aspects of the invention enable the monitoring of the condition of the electromagnetic brake without opening the brake casing or dismantling the brake in any way.

Other advantages of the invention are set forth in the attached description.

BRIEF DESCRIPTION OF THE FIGURES

In the following, the invention will be described in greater detail by means of preferred embodiments and by referring to the attached figures, in which.

DETAILED DESCRIPTION OF THE INVENTION

The following describes the monitoring of the condition of a brake. By monitoring the condition of a brake, it is possible to obtain information on the actual condition of the brake so that maintenance work of the brake can be scheduled before a malfunction occurs in the brake and it fails. When a brake malfunctions, its grip and/or braking force may be diminished. This may be caused by a foreign object in the brake, the glazing of the brake surfaces, the corrosion of the brake and/or the wear of the friction material in the brake disc, for example.

When it is detected that the condition of the brake has deteriorated, it is possible to apply predictive maintenance to the brake. Predictive maintenance is a maintenance method based on the actual condition of a device. The condition of the device or its component is measured by variables that change as parts wear. The measurement variables are defined limits, within which the device works in the desired manner, and when this limit is exceeded, the parts will be serviced or replaced.

By means of some embodiments of the invention, the following advantages, among other things, are achieved: a brake monitoring device allows for cost-effective operation of a hoisting device; when using a coil in monitoring the brake, voltage feed need not be arranged for it; the condition of the brake can be monitored without the risk of falling; it can be arranged to many brakes without being dependent on the measurements or structures specific to each type of brake; the condition of the brake can be monitored remotely; brake maintenance can be arranged at a predetermined time; the present brake monitoring offers for use a great deal of information on the behaviour of the brake at low cost.

Figure 5:
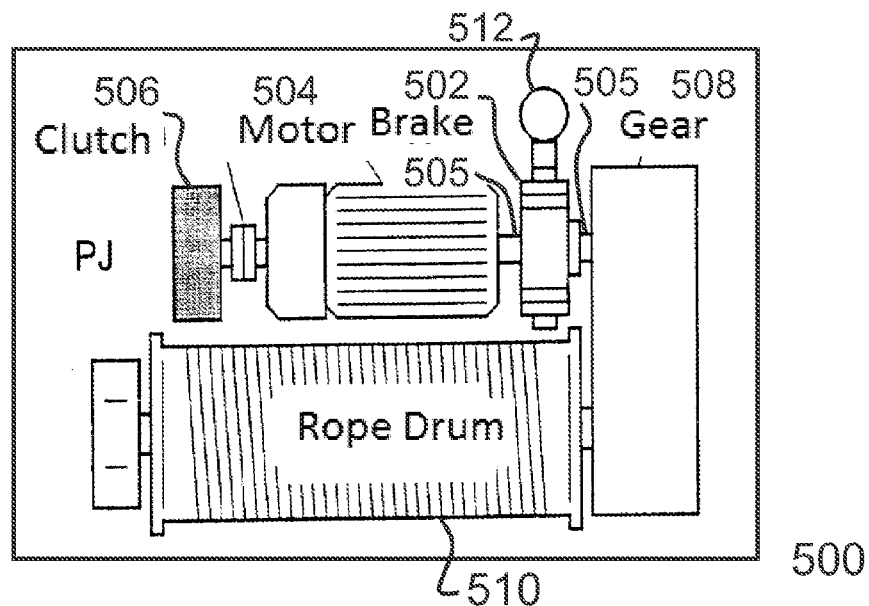
FIG. 5 shows a hoisting device with an electromagnetic brake that is monitored according to an embodiment.

The following description describes the monitoring of the condition of a brake, such as a disc brake, in a hoisting device. This type of hoisting device is shown in FIG. 5, for example, where the brake is shown connected to power transmission from the motor to load-lifting means.

The condition of the brake of a hoisting device can be determined in levels. The condition levels may be: new, worn, needs replacement, and failed. The condition of the brake has diminished, when its level of condition is not 'new'. When the brake has 'failed', it has a malfunction.

It should be noted that the numerical values of the variables used in the implementation of the embodiments in the following description may be positive or negative. In the following description, the numerical values are assumed to be positive, unless otherwise indicated. However, it is apparent to a person skilled in the art that it is also possible to use negative numerical values in the following embodiments, when the negative numerical values are made into absolute values.

In an embodiment, the level of condition of the brake can be determined by measuring time between the change in the magnetic field of the brake to the change in the state of the braking surfaces. The determined time is proportional to the size of the air gap of the brake, as revealed by the description below and FIG. 7b, for example. From the change in the size of the air gap, it is in turn possible to determine the drop in the level of condition of the brake that may be due to mechanical and/or electrical defects of the brake. Mechanical defects of a brake include wear of friction material, and blocking and corrosion of the brake. Electrical defects of a brake include disturbances in the current supply of the brake and the breakdown of the magnetizing means, such as coil, of the brake.

In an embodiment, when the level of condition of the brake is monitored by measuring time between the change in the magnetic field of the brake to the change in the state of the braking surfaces, it is possible to detect too small and/or too large an air gap of the brake. Because the measured time is proportional to the size of the air gap of the brake, as revealed by the description below and FIG. 7b, for example, it is possible to detect too large or too small an air gap of the brake from the measured time. Typically, the air gap of a brake may be in the range of 0.4 to 1.2 mm. When, in the present embodiments, a time period is measured that differs from opening or closing times corresponding to a typical air gap defined for a brake, it is possible to define a malfunction of the brake.

Figure 1:
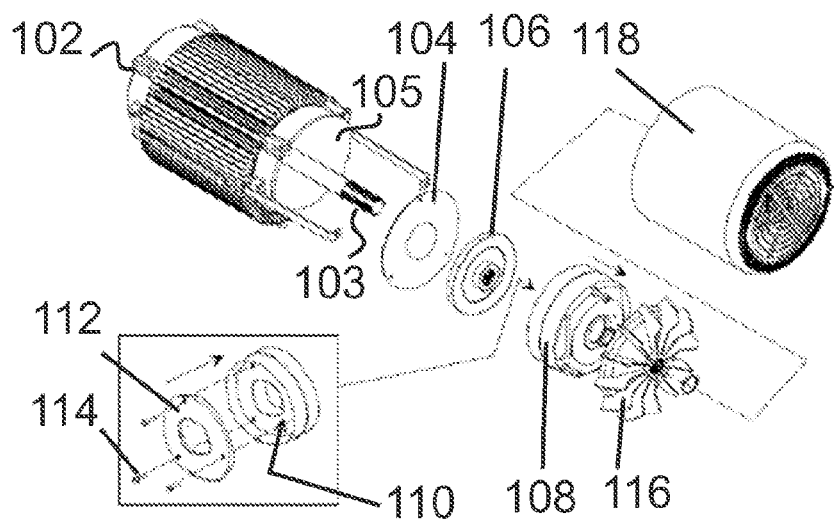
FIG. 1 shows an exploded view of a brake that is mounted to a motor of a hoisting device and can be used in some of the present embodiments.

FIG. 1 shows an exploded view of a brake that is mounted to a motor of a hoisting device and can be monitored in accordance with the present embodiments. FIG. 1 shows a motor 102 that is decelerated with a brake structure installed in it. The brake structure comprises a brake disc 104, anchor plate 106 and brake frame/brake rotor 108. The anchor plate 112 is fastened inside the brake 110 with screws 114, for instance. The brake structure also comprises a fan 116 and fan housing 118. The brake structure may be mounted in the motor 102, on the motor axle 103. The brake housing may extend to protect both the fan and the brake structure.

When the brake is mounted on the motor axle, at least one of the braking surfaces of the brake, for instance the brake disc, may be mounted to rotate with the motor axle. When braking with the brake of FIG. 1, the braking surfaces press against each other, whereby the brake disc presses to the friction plate 105 and the anchor plate to the friction plate through the anchor plate connected to the friction plate.

Figure 2A:
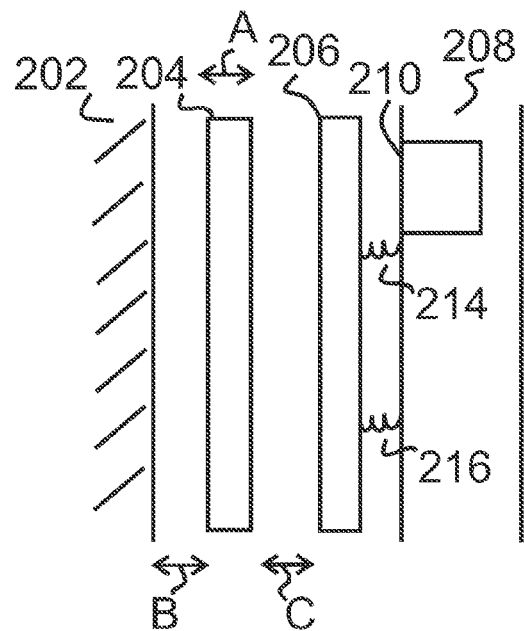
FIG. 2a shows a brake according to an embodiment, when it is open.
Figure 2B:
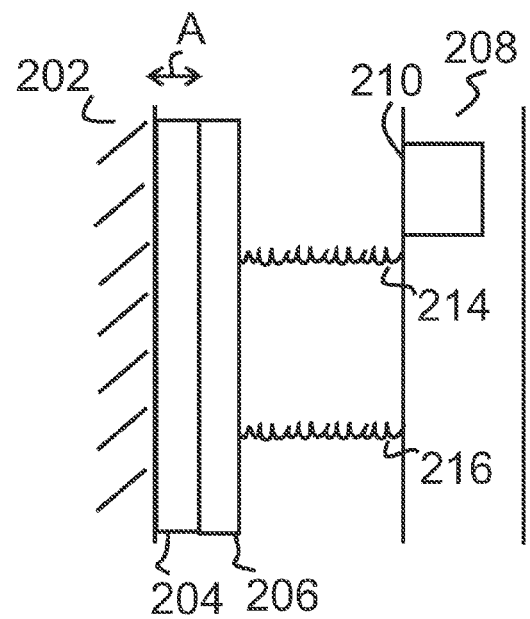
FIG. 2b shows a brake according to an embodiment, when it is closed.

FIGS. 2a and 2b show a brake according to an embodiment in different states. The states of a brake can be determined from the states of its braking surfaces. FIG. 2a shows a brake according to an embodiment with the brake open. FIG. 2b shows a brake according to an embodiment with the brake closed.

Different states of a brake will now be described with reference to both FIGS. 2a and 2b, in which the brake comprises first 202, 204 and second 206, 204 braking surfaces and magnetizing means 210 arranged to move the braking surfaces to an open state, in which the braking surfaces 202, 204, 206 are separated from each other, and to a closed state, in which the braking surfaces 202, 204, 206 are connected to each other. When the braking surfaces are in the closed state, they are pressed against each other.

The magnetizing means 210 may comprise a coil, magnet or some other device that generates a magnetic field when electric current, such as direct current, is supplied to it. The magnetizing means may be mounted on a support structure 208 that may comprise the brake 110, for example, as in FIG. 1.

Springs 214 and 216 are fastened to the braking surface 206 to push the braking surface 206 toward the braking surfaces 202 and 204, whereby they press against each other, when current is not supplied to the magnetizing means and there is no magnetic field generated by the magnetizing means.

In FIG. 2a, electric current is supplied to the magnetizing means and they generate a magnetic field that generates to the braking surfaces a force that resists the force of the springs 214, 216 and thus keeps the braking surfaces separate from each other. An air gap b, c is then formed between the braking surfaces. A typical combined air gab b+c is in the size range of 0.4 to 1.2 mm. The brake then works in the desired manner, that is, its braking effect is not diminished. If the air gap is larger, the brake disc of the brake is worn and needs to be replaced to achieve the desired operation for the brake. The brake may then be defined as malfunctioning. If the air gap is smaller than desired, it is possible that the brake is in contact in an undesired manner even during driving. This may lead to energy loss, brake material wear and/or glazing as well as to the brake getting dusty.

Braking wears the friction material of the brake disc and thus enlarges the air gap of the brake. The air gap of the brake refers to the air gap, b+c, inside the brake, when the brake is open. During opening, the magnet of the brake pulls the anchor plate away from the brake disc, thus enabling the free rotation of the motor. If the air gap is too large, the magnetizing means cannot pull the anchor plate to them and the brake does not open. This may also be caused by a faulty adjustment of the air gap.

The air gap may also be too small. If the air gap is too small, the brake cannot open properly, whereby driving against the brake may occur at least to some extent. Too small an air gap may also be caused by a faulty air gap adjustment.

In an embodiment, it is possible to determine the wear of the friction material of the brake by measuring the air gap. For instance, in FIG. 2a the wear of the brake disc 204 may be detected as an increase in the air gap, b+c, of the brake. The thickness of the friction material may determine the condition of the brake. In an extreme case, the friction material may be worn out, in which case the brake is faulty and malfunctions. The air gap is then at its largest and exceeds the highest value, 1.2 mm, of the typical air gap in a brake. In the other extreme, the condition of the brake is new or corresponding to new, when the thickness of the friction material is at its maximum. The air gap is then at its smallest, for instance at the lowest limit, 0.4 mm, of the above-mentioned typical air gap.

In a brake disc, the thickness of the material may be 11.15 mm when new and 10.4 mm when worn out. This thickness of the material is the total of the thicknesses of the iron material of the brake disc and the friction material on both sides. The proportions of the material thicknesses (friction:iron:friction) in the wear direction are approximately 1:1:1.

In FIG. 2b, electric current is not led to the magnetizing means, whereby they do not generate a magnetic field that would keep the braking surfaces separate. The springs 214 and 216 then press the braking surfaces against each other.

Figure 3A:
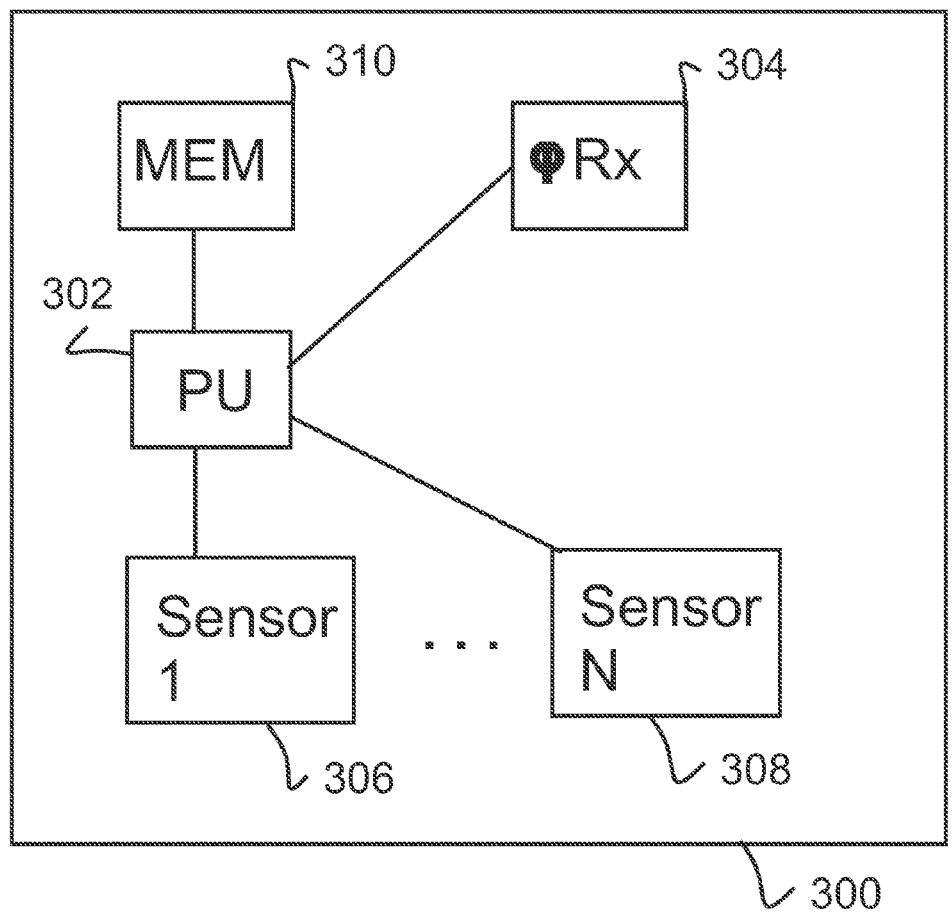
FIG. 3a shows a device for monitoring the condition of a brake according to an embodiment.
Figure 3B:
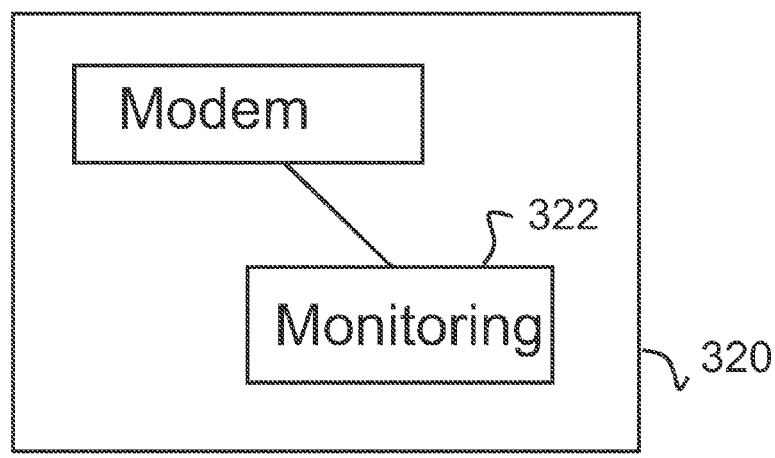
FIG. 3b shows a device for monitoring the condition of a brake according to an embodiment.

In an embodiment, the braking surface 202 may be a friction plate, the braking surface 204 may be a brake disc and the braking surface 206 may be an anchor plate. The brake disc is preferably made of a material with high friction so that when the brake is closed in FIG. 2b, braking is effective. When the braking surfaces are in the closed state, in FIG. 2b, the anchor plate presses the brake disc against the friction plate, whereby all braking surfaces are against each other. The brake disc is then pressed between the anchor plate and friction plate, thus joining the anchor plate and friction plate. FIGS. 3a and 3b each show a device for monitoring the condition of a brake according to an embodiment. Even though the devices are shown as one unit, different modules and memory can be implemented as one or more logical units.

The device 300 of FIG. 3a comprises a processing unit 302, memory 310, means for receiving energy from a magnetic field 304 and one or more sensors 306, 308 that comprise at least means for determining the state of the brake. All units are electrically connected to each other. The memory may contain one or more programs that are executable by the processing unit.

The means for receiving energy from the magnetic field 304 transmit the received energy as an electric signal to the processing unit 302. The processing unit may determine the magnitude of the received energy from the received electric signal as an electric quantity. The electric quantity being determined may be voltage, for example. In an embodiment, the means for receiving energy from the magnetic field comprise a coil. The coil provides at its output a voltage that depends on the change in the magnetic field directed to the coil. Thus, it is possible to detect from the output voltage of the coil, when current is switched to the brake magnetizing means and a magnetic field is formed. When the control current of the brake comprises full-wave or halfwave rectified DC voltage, for example, the magnetic flux generated by the brake coil has plenty of time-variable harmonics that may be detected in the induced voltage.

In an embodiment, the means for receiving energy from the magnetic field comprise a Hall sensor. The Hall sensor detects a Hall Effect that is an electromagnetic effect based on Lorentz force, with which it is possible to determine the strength of a magnetic field. The Hall sensor provides at its output a voltage that depends on the strength of the magnetic field directed to the Hall sensor. In an embodiment, the means for determining the state of the brake comprise an acceleration transducer. The acceleration transducer is preferably a biaxial acceleration transducer. The acceleration transducer detects the mechanical opening and closing of the brake, in which the braking surfaces shift between open and closed states. The opening and closing of the braking surfaces create vibration that the acceleration transducer detects. The acceleration transducer transforms the vibration into an electric signal to the processing unit that may determine from the values of the signal received from the acceleration transducer that the braking surfaces have moved away from each other or against each other.

The mechanical opening of the brake can be detected from the bangs of the acceleration transducer. The vibration caused by the bang in the acceleration transducer is very strong at the moment of the bang and then dampens slowly.

The moment of the mechanical movement of the brake, $t_{mk}$, can be defined by the formula $$t_{mk} = \{\min(t) | U_{kh}(t) \geq U_{kh_0} + 0.5 V \cup U_{kh}(t) \leq U_{kh_0} - 0.5 V\}, \quad (1)$$

wherein $t_{mk}$ represents the smallest time instant of the acceleration measurement of the brake's opening or closing, with which the output voltage $U_{kh}(t)$ differs from its 0.5 V zero level $U_{kh_0}$. The deviation 0.5 V selected herein is a hoisting device-specific value that may be selected to exceed the noise level of the measurement and interfering vibrations, and the selection is a competence of a person skilled in the art.

In an embodiment, the sensors comprise a pulse sensor or a biaxial acceleration transducer for determining the angular velocity of at least one braking surface. The biaxial acceleration transducer is preferably installed on the inner circumference of the hoisting device roll. The hoisting device roll is often a hollow cylinder, inside which the acceleration transducer can be installed by screwing it to the inner surface of the roll, for instance. By taking the transmission ratio of the roll and motor into account, it is possible to determine the angular velocity of the braking surface from the rotation of the roll. The biaxial acceleration transducer should be wireless as it rotates on the roll. The pulse sensor is preferably installed on the motor axle. The pulse sensor may be installed at either end of the axle, for example. The rotating part of the pulse sensor can be fastened to rotate with the axle, and the rest of the frame of the pulse sensor to the non-rotating structures of the hoist.

The processing unit may contain a set of registers, an arithmetic logic unit, and a control unit. The control unit is controlled by a sequence of program instructions that are transferred to the processing unit from the memory. The control unit may contain numerous microinstructions for basic functions. Implementation of the microinstructions may vary depending on the configuration of the processor unit. The program instructions may be encoded in a programming language, which may be a high-level programming language, such as C and Java, or a low-level programming language, such as a machine language or an assembler. The memory may be a volatile memory or non-volatile memory, such as EEPROM, ROM, PROM, RAM, DRAM, SRAM, firmware, and programmable logic.

The device 320 of FIG. 3b comprises a device 322 for monitoring an electromagnetic brake, for example the device 300 of FIG. 3a. Data transmission means for transmitting and/or receiving information are electrically connected to the device 322 for monitoring the electromagnetic brake. The data transmission means may comprise a modem unit, for instance, for providing data transmission between the network and device 320. The network may be a wireless network, in which information is transmitted wirelessly on the radio frequency band of the network. The data transmission means may then comprise necessary means for radio-frequency data transmission, for instance an antenna transformer for transforming the information being transmitted between the radio frequency band of the network and base frequency.

An embodiment provides a computer program on a distribution medium and comprising program instructions that when downloaded into an electronic device make the processing unit execute an embodiment according to the present invention.

The computer program may be in source code format, object code format or in some intermediate format, and it may be stored on a transfer medium that may be any entity or device that is capable of storing the program. Transfer media of this type include a storage medium, computer memory, read-only memory, electric carrier wave, data communications signal and software distribution package, for instance.

The device 300 can also be implemented as one or more integrated circuits, such as an application specific integrated circuit, ASIC. Other implementations are also possible, such as a circuit made of separate logic components. A hybrid of these different implementation alternatives is also possible. An example of circuits made of logic components is the FPGA (field programmable gate array) circuit.

It is apparent to a person skilled in the art that the devices shown in FIGS. 3a and 3b may also contain other parts than those described above, but which are not essential to the invention and have, therefore, been left out to make the presentation clearer.

In the devices of FIGS. 3a and 3b, the means for receiving energy from the magnetic field may comprise a coil, for instance, with a diameter of approximately 10 mm and length of approximately 20 mm.

In the devices of FIGS. 3a and 3b, the means for determining the state of the brake may comprise an acceleration transducer, for instance a piezo-resistive, piezo-electric or capacitive sensor of a size corresponding to that of the coil.

In the devices of FIGS. 3a and 3b, the Hall sensor may be a MEMS (Microelectromechanical systems) sensor that is about the size of a transistor, its main dimensions being 3 to 4 mm.

Typical brakes to be monitored are 150 to 250 mm in diameter and 100 to 150 mm high in the axial direction. The differences in dimensions provide a possibility to position the sensors in an optimal manner in quite a few brake types and bodies. The differences in dimensions leave room to enclose the sensors to protect them from impacts and dirt in an industrial environment.

Figure 4:
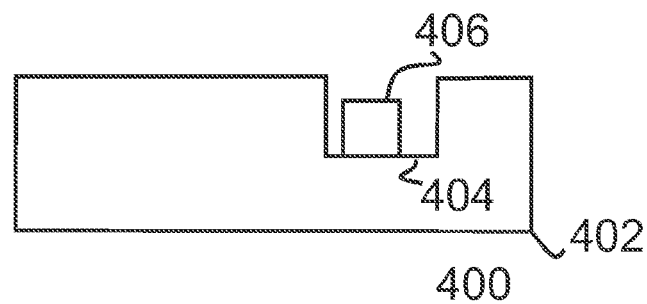
FIG. 4 shows an electromagnetic brake equipped with a device for monitoring the condition of the brake according to an embodiment.

FIG. 4 shows an electromagnetic brake 400 equipped with a device 406 for monitoring the condition of the brake according to an embodiment. The device 406 for monitoring the condition of the brake, that is, monitoring device, may be a device according to FIG. 3a or 3b with means for receiving energy from the magnetic field of the brake. The device for monitoring the condition of the brake is then preferably placed outside the brake casing 402, whereby its installation is fast and the brake casing need not be opened and closed to start monitoring the brake. The brake casing may be the fan housing 118, for instance, shown in FIG. 1, which also extends to protect the brake.

In FIG. 4, the device for monitoring the condition of the brake is placed in a recess 404 in the casing 402. This type of recess may be of a depth that the device can be entirely embedded therein so that the recess protects the device from possible external forces, such as impacts. The recess may also be shallower than the total height of the monitoring device 406, in which case a part, such as the antenna of the monitoring device, may extend outside the recess. This way, a better quality for the data transfer connection to and/or from the monitoring device can be ensured than if the device were entirely embedded in the recess.

The recess 404 to which the monitoring device 406 of the brake is installed may permit the installation of the monitoring device 406 closer to the magnetizing means of the brake, in which case the magnetic field received by the monitoring device is stronger than at other points on the surface of the brake casing. When installing the monitoring device at the bottom of the recess, the monitoring device and its means for receiving energy from a magnetic field are thus closer to the magnetizing means of the brake than when installing it elsewhere on the surface of the brake.

The recess 404 may thus advantageously provide a strong magnetic field of the brake for the monitoring device to receive. It is then possible to be more flexible with the requirements for the reception sensitivity of the monitoring device, and the monitoring device may be made of more inexpensive components. In addition, the recess may offer the monitoring device protection against impacts. It is possible that the recess cannot always be positioned in an advantageous manner for the reception of the magnetic field of the brake. However, in such a situation, too, the recess offers protection for the monitoring device.

FIG. 5 shows a hoisting device 500 with an electromagnetic brake 502 that is monitored according to an embodiment. The following describes the structure of the hoisting device of FIG. 5 and typical operating situations, for example malfunctions, of the brake and the hoisting device using the brake by utilising the structure of the hoisting device of FIG. 5 by way of example. One should note that the shown operating situations are not only limited to the hoisting device of FIG. 5 and other structures are also possible.

In the hoisting device of FIG. 5, the rope drum 510 is operationally coupled to the electromagnetic brake 502 by power transmission means 505, 508.

The motor 504 of the hoisting device generates a mechanical movement that is transmitted to the rope drum 510 through the power transmission means. The power transmission means 505 may comprise a motor axle 505, for instance, with which power coupled to the rotating movement of the axle is transmitted from the motor. When the motor axle rotates, the rotating movement of the axle is transmitted to the devices, such as load lifting means 510, coupled to it. When the motor thus drives the load lifting means, the load attached to the load lifting means moves.

In an embodiment, the power transmission means comprise a motor axle 505 and transmission gear 508 with which the power from the motor can be set to drive the load lifting means 510 to either lift or lower the load. In addition, the transmission gear can be used to adjust the velocity, by which the load lifting means move the load.

In an embodiment, the load lifting means may comprise a rope drum 510. When the power transmission means comprise a transmission gear, the rotation direction and/or velocity of the rope drum can be adjusted. The rotation velocity can be measured by the angular velocity $\omega$ of the rope drum.

The hoisting device 500 may comprise a switch 506 with which the motor can be coupled or decoupled from the transmission gear 508. After the motor has been coupled to the transmission gear, the power of the motor can be transferred to the rope drum 510 and the load moved. When the motor has been decoupled from the transmission gear, the power of the motor is not transmitted to the rope drum and the load cannot be moved.

In an embodiment, the hoisting device comprises a brake 502 that is coupled to the power transmission means 505 of the motor, whereby the brake may decelerate and/or stop the mechanical movement transmitted from the motor or load lifting means to the power transmission means. The brake may be coupled to the motor axle, for example, as shown in FIG. 1, where the brake disc is installed on the motor axle. In such a case, during braking the braking surfaces shift to the closed state shown in FIG. 2*b*, whereby the brake resists the movement transmitted from the axle.

In an example, the movement of the power transmission means may originate from the motor when it is running and provides the mechanical rotating movement of the axle. The movement may also originate from the hoisting device that is coupled to the axle through the transmission gear, for instance, and provides to it a mechanical force, the magnitude of which is determined by the mass of the load connected to the hoisting device. When the force transmitted to the power transmission means from the motor or hoisting device exceeds the braking force, the brake may be said to slip. When the motor is running and runs the power transmission means with the brake closed, the motor may be said to run against the brake.

Excessive running against the brake weakens the operation of the brake and may cause the load to fall and even the brake to explode. In addition, running against the brake may damage the motor. When running against the brake, the brake may slow down or completely stop the movement transmitted from the power transmission means. Running against the brake may be caused by corrosion of the brake, seizing up of the brake, too large or too small an air gap, or an electrical fault. Running against the brake can be divided into electrical and mechanical faults.

Brake slipping may comprise brake malfunction that is not generally caused by normal wear of the brake. These faults are caused by internal or external factors or even by the user. It is difficult to monitor the development of faults, because a fault appears unexpectedly and causes either immediate slipping in the brake or slipping may take place for a longer period of time without causing any actual dangerous situation. However, the falling of the load is also possible with a slowly progressing slipping, so immediate maintenance is necessary. There may be many reasons for the slipping of a brake, such as dust accumulation, oil accumulation, getting wet, overheating, glazing and melting. When the brake slips, the load may fall, which is why a slipping brake should be serviced immediately.

In an embodiment, the hoisting device 500 comprises a monitoring device 512 for monitoring the condition of the brake. The monitoring device may be the monitoring device shown in FIGS. 3*a* and 3*b*, for instance. The monitoring device may be installed on a brake in the hoisting device in the manner that the monitoring device is installed in the brake in FIG. 4. With reference to FIG. 5, when monitoring the brake 502, the monitoring device provides information on the condition of the brake on the basis of the information provided by sensors connected to the monitoring device.

Figure 6:
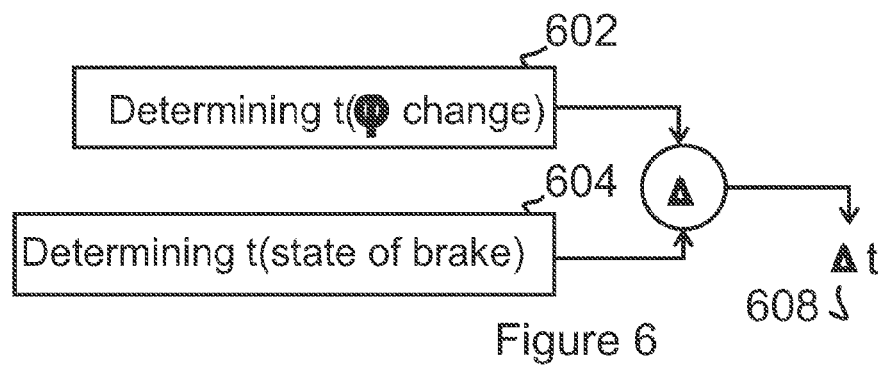
FIG. 6 shows an operational block diagram for monitoring a brake.

FIG. 6 shows an operational block diagram for monitoring a brake. The brake may be an electromagnetic brake, for example, the braking surfaces of which are in the open state, as shown in FIG. 2*a*, and closed state, as shown in FIG. 2*b*. The brake may comprise magnetizing means arranged to move the braking surfaces to an open state, in which the braking surfaces are separated from each other, and to a closed state, in which the braking surfaces are connected to each other.

The monitoring of the brake may comprise the monitoring of the condition of the brake on the basis of the wear of the braking surfaces. As a result of the wear of the braking surfaces, the air gap between the braking surfaces becomes larger when the brake is in the open state. The air gap of the braking surfaces may comprise the sum of several air gaps, as in FIG. 2a where the air gap comprises gaps b and c and the total air gap is the sum of b and c.

The block diagrams shown in FIG. 6 can be implemented by the devices of FIGS. 3a and 3b, for instance, which contain the means for receiving energy from a magnetic field and the sensor detecting the state of the brake, and the processing unit may thus perform the operations of the block diagram in FIG. 6 on the basis of the information provided by the devices connected to it.

Block 602 of the block diagram defines the time instant $t_\phi$, when the magnetic field (I) of the magnetizing means of the brake changes. The time instant of the brake state change $t_{open/closed}$ is defined in block 604. The difference 606 between the defined time instants provides the time 608, $\Delta t = t_\phi - t_{open/closed}$, that elapses from the change in the magnetic field caused by the magnetizing means to the shift of the braking surfaces from one state to another.

Figure 7A:
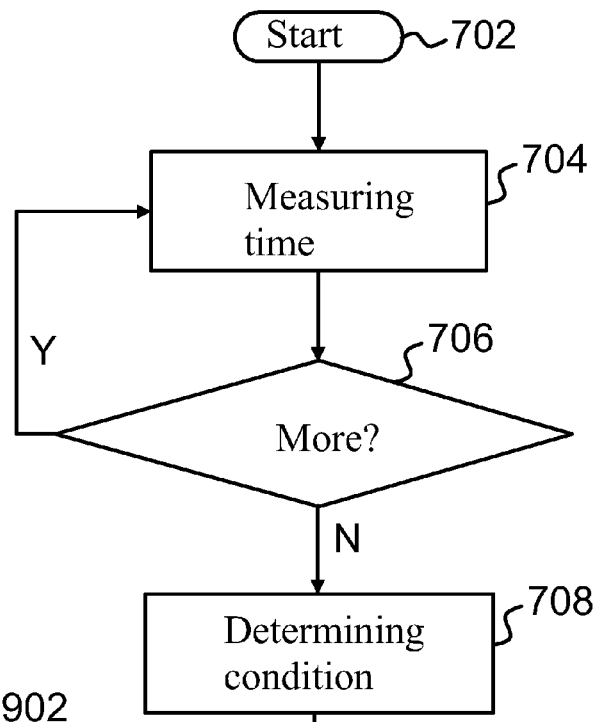
FIG. 7a shows a method for monitoring the condition of a brake according to an embodiment.

FIG. 7a shows a method for monitoring the condition of a brake according to an embodiment. The method can be performed with the monitoring device for the condition of a brake shown in FIGS. 3a and 3b. The brake to be monitored may be an electromagnetic brake according to FIGS. 2a and 2b.

The method begins in step 702, in which the monitoring device is installed in the brake.

The monitoring device 704 measures time $\Delta t$ from the change in the magnetic field caused by the magnetizing means to the shift of the braking surfaces from one state to another. The change in the magnetizing field is caused by the connection and disconnection of control current to the magnetizing means of the brake, when the brake is opened and closed, respectively. The shift of the braking surfaces from the open state to the closed state or vice versa can be detected by an acceleration transducer that reacts to the movement of the braking surfaces.

In an embodiment, the measuring of step 704 may be performed as shown in FIG. 6.

If more than one measurement is performed, the measurement of step 704 may be repeated, and the method returns from 706 to 704. When a desired number of measurements 704 have been made, the method continues from 706 to 708 to determine the condition of the brake on the basis of the conducted measurements.

In an embodiment, after several measurements on the time from the change in the magnetic field caused by the magnetizing means to the shift of the braking surfaces from one state to another, the condition of the brake may be determined on the basis of the change in the measured times $\Delta t$.

Figure 7B:
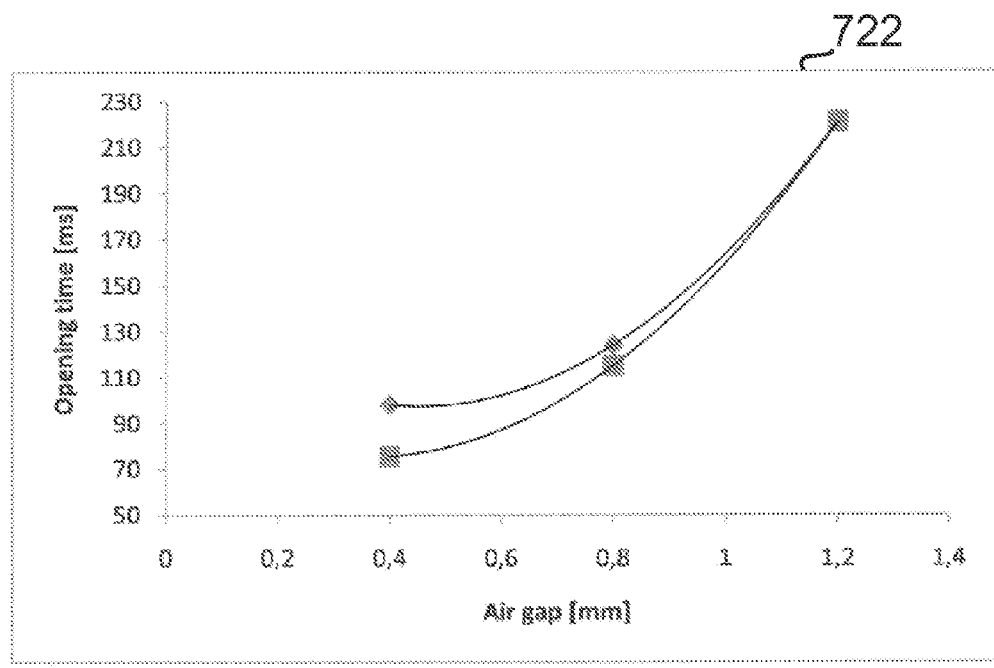
FIG. 7b shows measurements on the effect of the size of the air gap of the brake on the time that elapses as braking surfaces shift from closed state to open state and open state to closed state.
Figure 7B:
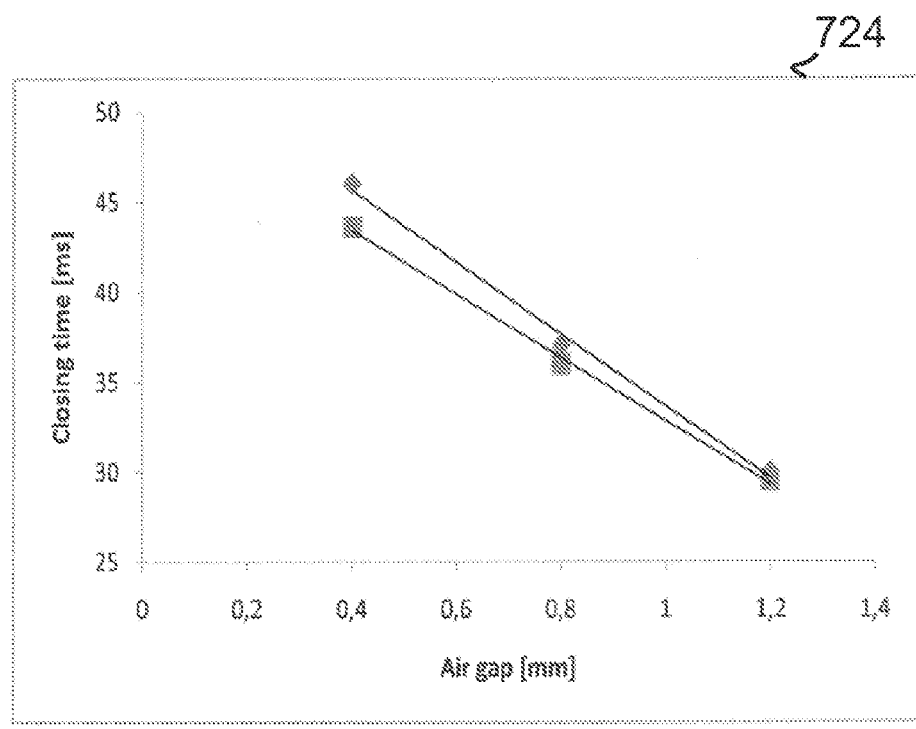

The effect of the change in the measured times $\Delta t$ on the air gap of the brake is shown in FIG. 7b, in which the first curve 722 shows the relation of the opening time of the braking surfaces to the air gap of the braking surfaces, and the second curve 724 shows the relation of the closing time of the braking surfaces to the air gap of the braking surfaces.

The air gap of the braking surfaces becomes bigger when one or more braking surfaces wear as the brake is used. When the braking surfaces are new, the air gap of the braking surfaces is at its smallest, because the braking surfaces have not worn. As the braking surfaces wear in use, the air gap becomes bigger. Thus, the air gap of the braking surfaces shows the condition of the braking surfaces and, therefore, also the brake.

With reference to FIGS. 2a and 2b, the wear of the brake disc 204 widens the air gap, b+c, of the braking surfaces, when the brake is open. With reference to FIG. 7b, as a result of the wear of the braking surfaces, the opening time of the brake increases, as shown by curve 722. Curve 724 shows that the widening of the air gap as a result of wear, for instance, decreases the closing time.

In an embodiment, the condition of the brake may be defined 708 to be on different levels on the basis of the one or more time measured in step 704. The condition levels may be: new, worn, needs replacement, and failed. When the brake has 'failed', it has a malfunction.

In an embodiment, several measurements 704 are made on the time from the increase of the magnetic field of the brake and on the shift of the braking surfaces from the closed state to the open state, and a decrease 706 in the brake condition is determined, when the measured times are increasing.

In an embodiment, several measurements 704 are made on the time from the decrease of the magnetic field of the brake and on the shift of the braking surfaces from the open state to the closed state, and the decrease 706 in the brake condition is determined, when the measured times are decreasing.

In an embodiment, after defining the decrease in the condition of the brake, the condition level of the brake may be determined by comparing the brake's opening and/or closing time measured in step 704 with time limits of corresponding opening and/or closing times on different condition levels of the brake. For instance, when the condition level of the brake is 'new', which means its friction materials have not essentially worn, the opening time of the brake may be 90 ms. When the condition level of the brake is 'worn', which means that the thickness of the friction materials may be decreased in comparison with a new brake, the opening time may be 110 ms. When the condition level of the brake is 'needs replacing', the opening time may be 160 ms. When the condition level of the brake is 'failed', the opening time may be 160 ms.

In an embodiment, the condition of the brake may be determined when the time measured in step 704 differs from the time range defined for the brake. As seen in FIG. 7b, a typical air gap of a brake may be 0.4 to 1.2 mm, for example. It is then possible to define opening and closing times corresponding to the highest and lowest value of the typical air gap for the brake. When the time measured in step 704 differs from the time range defined for the brake, it is possible to determine the decrease 708 in the condition of the brake. The brake may then be defined as malfunctioning.

The method ends 710, when the condition of the brake has been defined.

Figure 8:
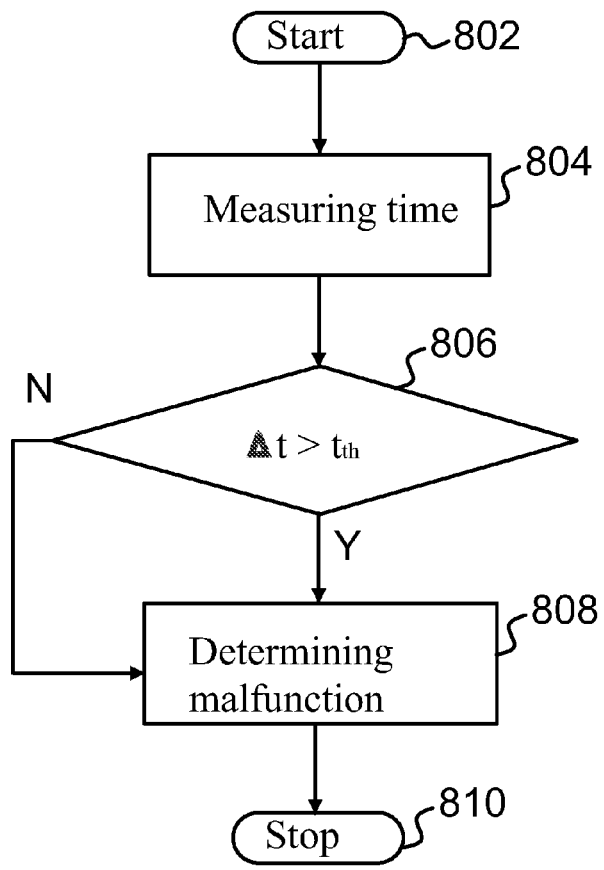
FIG. 8 shows a method for determining a malfunction of a brake according to an embodiment.

FIG. 8 shows a method for defining a malfunction of a brake according to an embodiment. The method measures time that elapses from the change in the magnetic field caused by the magnetizing means to the shift of the braking surfaces from one state to another.

The method may be executed with the device of FIGS. 3a and 3b, for instance. The method begins 802, when the monitoring device has been installed in the brake and the magnetic field of the brake's magnetizing means is receivable.

In step 804, the time is measured that elapses from the change in the magnetic field caused by the magnetizing means to the shift of the braking surfaces from one state to another. The time may be measured from the time of the increase in the magnetic field of the brake and the shift of the braking surfaces from the closed state to the open state, or from the decrease in the magnetic field of the brake and the shift of the braking surfaces from the open state to the closed state, as described above in FIG. 7a and in connection with step 704. Time may be measured as shown in FIG. 6.

A threshold value $t_{th}$ may be set for the time $\Delta t$ measured in step 804. If the measured time $\Delta t$ exceeds the threshold value $t_{th}$ 806, a malfunction 808 of the brake is defined. If the measured time $\Delta t$ does not exceed the set threshold value $t_{th}$

806, the method ends 810. $t_{th}$ may be 1 s, for example, or it may be defined on the basis of opening and closing times corresponding to a typical air gap for the brake, as explained in connection with FIG. 7a above.

Figure 9A:
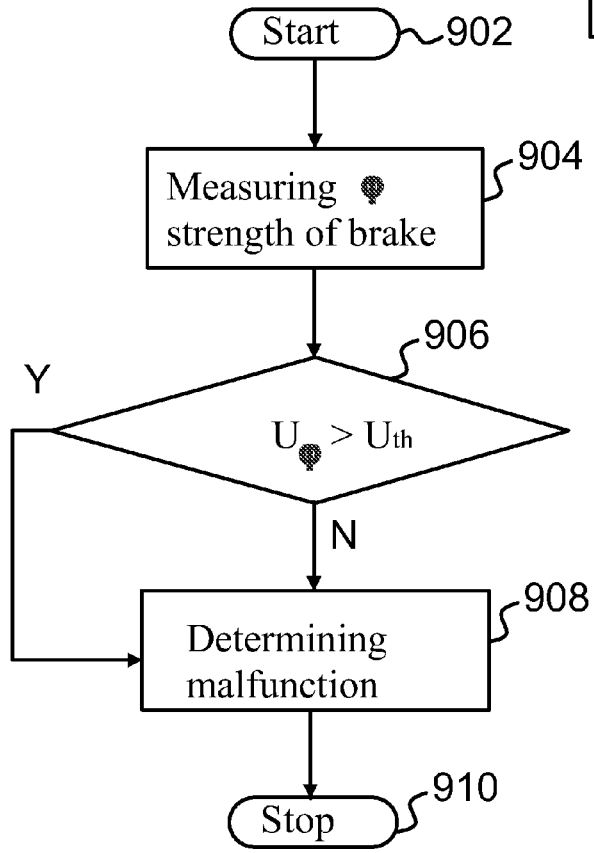
FIG. 9a shows a method for determining a malfunction of a brake according to an embodiment.

FIG. 9a shows a method for defining a malfunction of a brake according to an embodiment. The method may be executed with the device of FIGS. 3a and 3b, for instance, in which the strength of the brake's magnetic field can be measured. The strength of the magnetic field can be measured from the energy received from the magnetic field as voltage, for example. The method begins, when the monitoring device has been set to measure the strength 902 of the brake's magnetic field.

In step 904, the strength of the brake's magnetic field is determined. The strength of the brake's magnetic field may be measured in the open or closed state of the brake, of which examples are shown in FIGS. 2a and 2b.

In an embodiment, the strength of the magnetic field may be measured 904 for instance after the change in the state of the brake from the closed state to the open state. The time of the state change may be detected by an acceleration transducer in block 604 of FIG. 6, for instance.

In an embodiment, the strength of the magnetic field may be measured 904 after a given time, during which the brake must open when it is in order and meets the requirements set for the operation of the brake.

In an embodiment, a threshold value is defined for the time $t_{th}$ that elapses from the change in the magnetic field caused by the magnetizing means to the shift of the braking surfaces from one state to another. $t_{th}$ may be approximately 1 s, for instance, which is measured from the starting time $t_\phi$ of the formation of the magnetic field. If after this time has elapsed, the strength of the magnetic field is not higher than the set threshold value 906, the brake has not opened after one second from the starting time of the formation of the magnetic field, and a malfunction of the brake can be determined 908. Because the brake has not opened, its condition level may be noted as 'failed'.

When the strength $U\phi$ of the magnetic field of the brake is higher than the threshold value $U_{th}$ 906 set for it, the method moves to the end 910.

In an embodiment, in which the strength of the magnetic field is measured 904 after the change in the state of the brake from the closed state to the open state, the threshold value $U_{th}$ is preferably set in such a manner that when the strength $U\phi$ of the magnetic field exceeds the threshold value $U_{th}$, the brake opens. When the strength $U\phi$ of the magnetic field is below or equal to the threshold value $U_{th}$, the brake is open, the braking surfaces are separated from each other and it is not possible to run against the brake. The threshold value $U_{th}$ may be a voltage value, for instance, in the range of 0 to 0.7 V. It should be noted that the threshold values $U_{th}$ for the strength of the brake's magnetic field in the change of the brake's state from the open to the closed position and vice versa are preferably set to be unequal. $U_{th}$ can then be set high and closer to the highest value of the brake's magnetic field, when the state of the brake changes from closed to open. The highest value of the brake's magnetic field corresponds to the value obtained when the brake is open and the braking surfaces are separated from each other. When the state of the brake changes from open to closed, the magnetic field is switched off and $U_{th}$ can be set low and closer to the smallest value of the brake's magnetic field that is essentially zero or close to zero, 0.1 V to 0.01 V, for example.

When the strength of the brake's magnetic field is lower than the set threshold value $U_{th}$ 906, the brake's magnetic field is not high enough to open the brake and thus separate the braking surfaces from each other. The magnetizing means of the brake then do not work properly and the brake may be defined to have a malfunction 908. The malfunction defined in step 908 may be a result of an electrical fault in the brake, in the supply of electricity to the magnetizing means, for example. When a malfunction has been defined, the method ends 910.

Figure 9B:
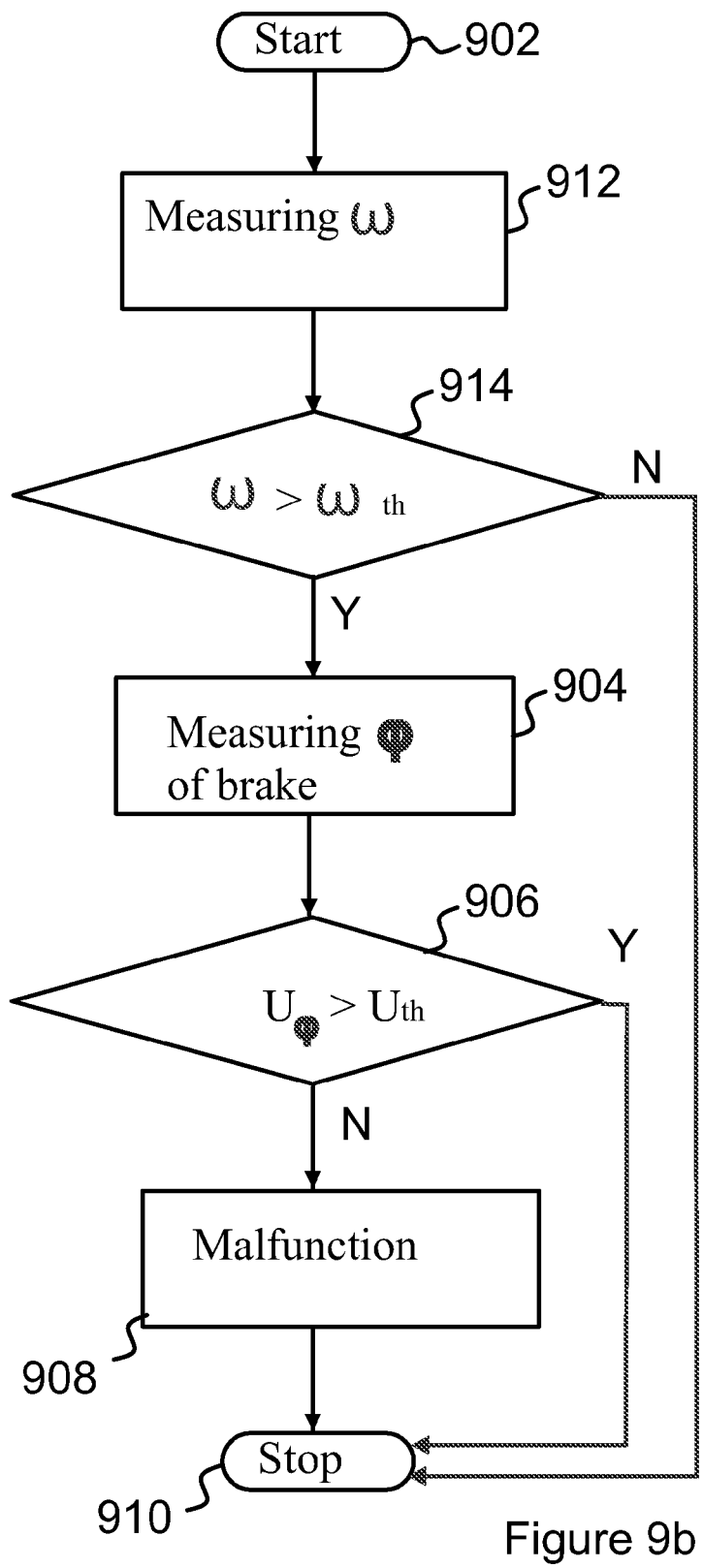
FIG. 9b shows a method for determining a malfunction of a brake according to an embodiment.

FIG. 9b shows a method for a more precise determination of a malfunction of a brake according to an embodiment. The steps marked with the same reference numbers in FIGS. 9a and 9b correspond to each other. Differing from FIG. 9a, 9b utilises information on whether the power transmission of the hoisting device is in use. When the power transmission is in use, the parts of the power transmission, illustrated in FIG. 5, for instance, transmit power from the motor or hoisting device to the brake. In the method of FIG. 9b, power transmission may be detected from the angular velocity ω of the motor or hoisting device.

Step 912 measures the angular velocity ω. Angular velocity may be measured 912 in the hoisting device, such as that of FIG. 5, for instance, either directly from the motor 504 or the rope drum 510.

When the measured angular velocity ω is higher than the set threshold value $\omega_{th}$, the method continues to step 904, where the strength of the brake's magnetic field is measured as described above in connection with the description of FIG. 9a. After this, the method of FIG. 9b follows the description of the method of FIG. 9a.

It should be noted that in the method shown in FIG. 9b, the steps added to FIG. 9a can also be performed before end of the method of FIG. 9a, after step 906, for instance.

With the methods of FIGS. 9a and 9b, it is possible to detect the so-called running against the brake and/or slipping of the brake. This way, it is possible to obtain more precise information on the operation of the brake and utilise it in determining the condition of the brake. With the method of FIG. 9a, it is possible to detect, in particular, the so-called running against the brake and/or slipping caused by the wear of the brake disc. With the method of FIG. 9b, it is also possible to detect the running against the brake caused by an electrical fault.

It should also be noted that the threshold value of time and/or the threshold values of the strength of the magnetic field described in connection with FIGS. 8, 9a and 9b as well as their use in determining a brake malfunction can also be used in other embodiments, as in FIG. 10.

Figure 10:
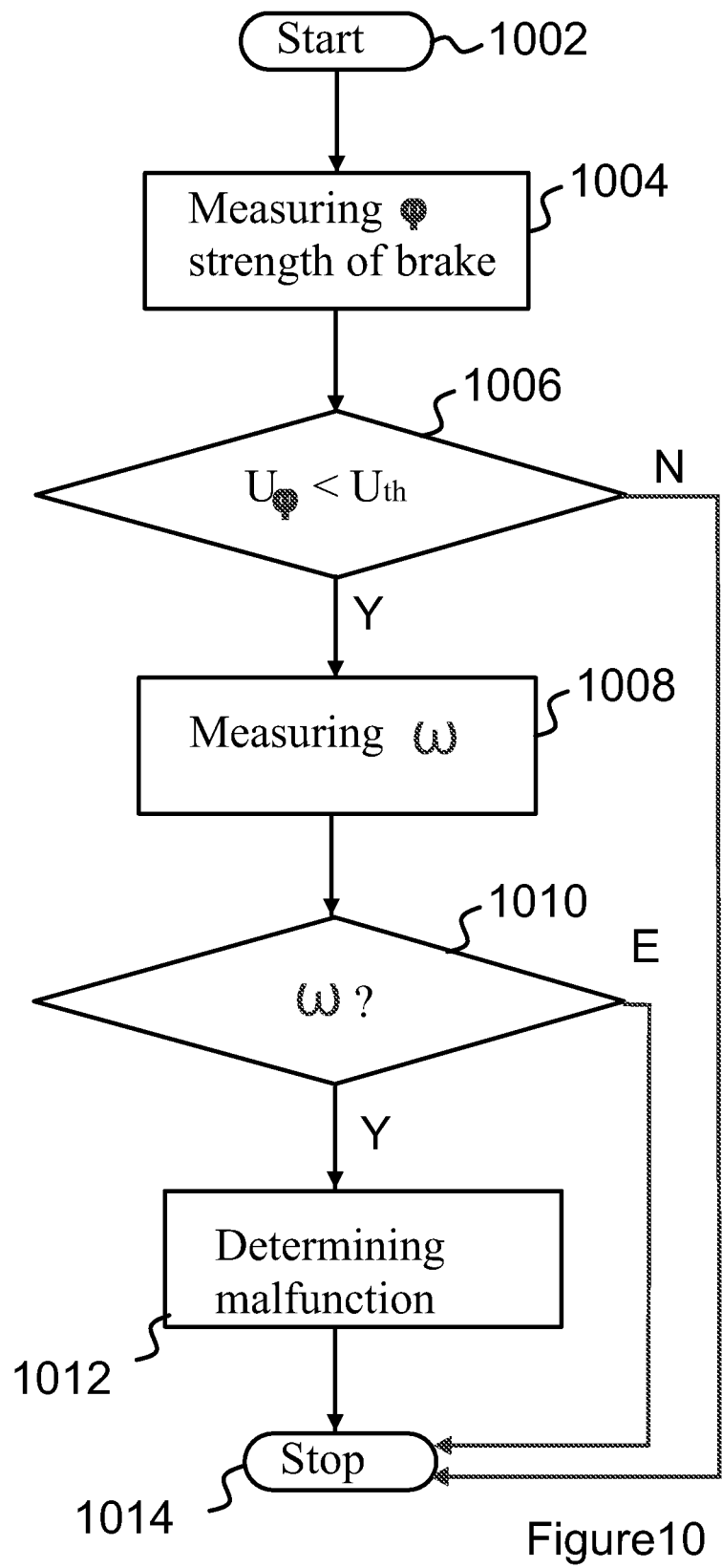
FIG. 10 shows a method for determining a malfunction of a brake according to an embodiment.

FIG. 10 shows a method for defining a malfunction of a brake according to an embodiment. The method may be executed with the device of FIGS. 3a and 3b, for instance, in which the strength of the brake's magnetic field can be measured. The strength of the magnetic field can be measured as a voltage, for example. The method begins 1002, when the monitoring device has been installed to measure the strength of the brake's magnetic field.

In step 1004, the strength of the brake's magnetic field is determined. The strength of the brake's magnetic field may be determined in the closed state of the brake, as shown in FIG. 2b, for example. The strength of the brake's magnetic field may be measured as voltage $U_\phi$, for instance, as in step 904 of FIG. 9. With reference to FIG. 10, when the strength of the magnetic field is lower than the threshold value $U_{th}$ set for it, the method moves to the end 1014. The threshold value $U_{th}$ is preferably set in such a manner that the detected strength of the brake's magnetic field is zero. The used measuring instrument may be calibrated in such a manner that the value, such as voltage value $U_\phi$, provided by it when the magnetizing means of the brake do not generate a magnetic field, can be defined as the zero level of the brake's magnetic field.

When 1006 the strength U$\phi$ of the brake's magnetic field is lower than the set threshold value $U_{th}$, which corresponds to a situation in which the magnetizing means of the brake do not generate a magnetic field, the method continues to step 1008 to measure the angular velocity ω. The angular velocity may be measured from the motor or the rope drum of the hoisting device. If the strength U$\phi$ of the brake's magnetic field is higher than or equal to the threshold value $U_{th}$, 1006, the brake may be noted to be open, in which case the brake may be considered to be in order and the method ends 1014.

In an embodiment, the angular velocity may be measured in the hoisting device, for instance in the hoisting device of FIG. 5, from the information received from the motor, frequency converter, rope drum or even the rope pulleys of the hoisting device. Different devices and/or sensors that provide information on the angular velocity can be coupled to the automation system of the hoisting device or crane directly or through a separate device, such as encoder, through which information on the angular velocity can also be obtained from the devices coupled to the encoder. The monitoring device of the brake's condition can thus also be supplied incorporated in the delivery of the hoisting device or crane and installed.

Angular velocity may be measured 1008 in the hoisting device, such as that of FIG. 5, for instance, either directly from the motor 504 or the rope drum 510. In measuring the rotation velocity of the motor, it is sensible to use a pulse sensor, because it is capable of detecting high rotation velocities. In addition, pulse sensors are designed to measure the velocity of a motor, so they are easy to purchase and install in devices, in which they are designed to be used.

When measuring from the rope drum, the velocity is lower than that of the motor due to the transmission ratio of the rotation of the motor. Detecting low velocities with a pulse sensor is imprecise and fastening in a reliable manner on a drum axle is often impossible due to the hollow cylindrical form of the drum. On a rope drum, it makes more sense to use an angle sensor based on a multiaxis acceleration transducer. Slow changes in the angle are more precisely detected with an acceleration transducer. Because rotating on an axle is also difficult or impossible for an acceleration transducer, it is more sensible to fasten it on the circumference of the rope drum. At low velocities, tangential acceleration is not assumed to disturb the definition of the angle significantly.

In an embodiment, the pulse sensor may be an incremental sensor, for instance, with an optical device that measures the angle of roll. The incremental sensor transmits through a pulse disc LED (light emitting diode) light that a receiving diode collects. The pulse disc has translucent and opaque lines at regular intervals and it rotates on the axle of the device being measured. As light hits a translucent line, the diode collects the light and forms it into a pulse that is transformed into a square wave. When the time between the pulses and the distance between the lines in the pulse disc are known, it is possible to determine the rotation rate on the basis of time. With the pulse intervals, it is also possible to define the rotating position as long as the initial position is known. The rotation direction is also known, if the pulse disc has two translucent line circles. The rotation direction may be determined from the lines at different phases on the basis of which of the pulses comes first.

In an embodiment, the pulse sensor may be an absolute sensor. Differing from the incremental sensor, an absolute sensor provides precise position information all the time. In an absolute sensor, the pulse disc has multi-bit individual geographical information for each position. This requires more light-emitting diodes (LED) and receiving diodes so that the binary code can be read.

In step 1010, the method determines whether angular velocity co was detected in step 1008. If no angular velocity was detected 1010, the method ends 1014. If angular velocity was detected, measured 1008 either from the motor or rope drum, the method continues to step 1012. When angular velocity ω is detected 1008, it has a value greater than 0. When in step 1012, the magnetic field $\phi$ of the brake is not on 1006, and its strength is below the set threshold value $U_{th}$ (in practice, zero), the magnetizing means of the brake are not operational. When the magnetic field is not on, the magnetizing means of the brake do not produce power to keep the braking surfaces of the brake separate, and the brake is closed, as in FIG. 2b, for example. When the braking surfaces are against each other, the brake resists movement and decelerates. Then, the angular velocity measured in step 1008 and noted in 1010 indicates that power may transmit from the power transmission means of the hoisting device to the brake, which means that there is a danger of running against the brake or of the brake slipping. In such a case, it is possible to define that the brake has a malfunction 1012. The method then ends in step 1014, when a malfunction of the brake has been defined. It should be noted that the actions and means for measuring the angular velocity described in connection with FIG. 10 and the use of the angular velocity in defining a malfunction in the brake can also be applied to other embodiments, as done in FIGS. 9a, 9b and 8, for instance.

Figure 11:
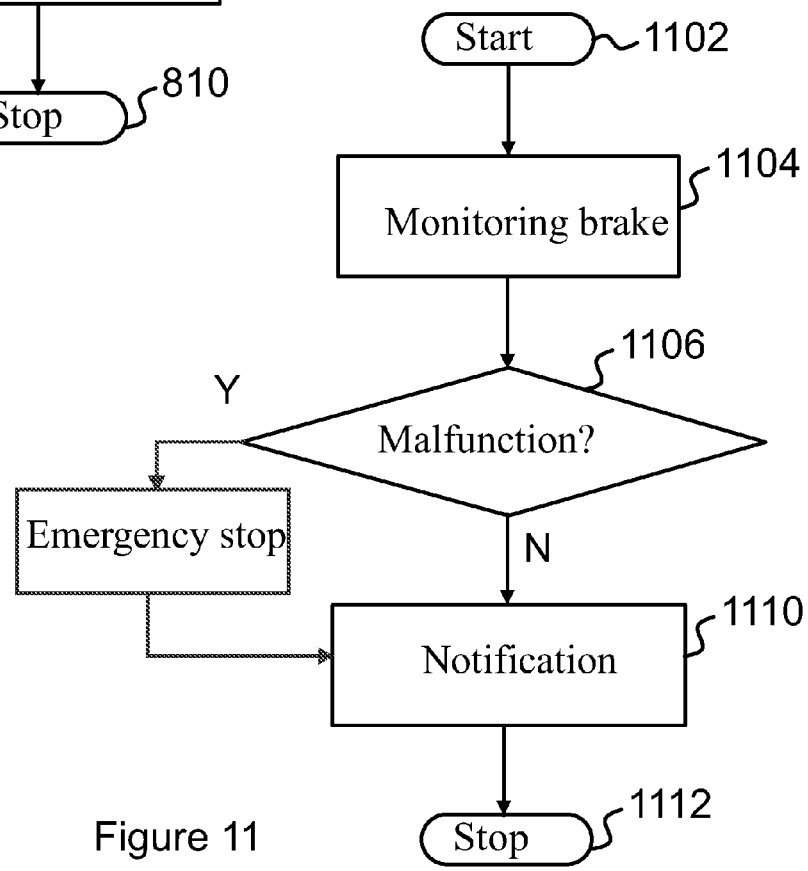
FIG. 11 shows a method for maintaining the condition of brakes according to an embodiment.

FIG. 11 shows a method for maintaining the condition of brakes according to an embodiment. The method may be executed with the device of FIGS. 3a and 3b, for instance, in which the strength of the brake's magnetic field can be measured. The method begins, when the monitoring device has been installed to measure 1102 the strength of the brake's magnetic field.

In step 1104, the brake is being monitored. Brake monitoring may comprise the process of the block diagrams in FIG. 6, for example, in which the time is measured that elapses from the change in the magnetic field caused by the magnetizing means to the shift of the braking surfaces from one state to the other. Brake monitoring may comprise the processes for monitoring a brake according to FIG. 7a, 8, 9 or 10. The condition of the brake is then defined in step 1104 as a condition level, for instance, as described in connection with step 708. The condition of the brake may be defined as failed, in other words, the brake has a malfunction, by using the methods of FIGS. 8, 9 and 10.

In an embodiment, step 1104 determines whether the brake has a malfunction or not. If the condition of the brake defined in step 1104 comprises a malfunction, the method continues to step 1108, in which an emergency stop may be performed on the brake. In the emergency stop, the motor of the hoisting device is working before the brake closes, after which the motor stops in a while. The emergency stop may be done by connecting the monitoring device of the brake to the control of the brake. The brake can then be stopped and possible damage caused by the condition of the brake avoided. In the emergency stop, the movement of the motor is stopped as quickly as possible. This may be done for example by cutting power to the motor and brake.

When the brake has been stopped by emergency stop 1108, the monitoring device of the brake may advise 1110 the condition of the brake to the service centre, whereby information is obtained on the need to service the brake and this can be arranged.

If the brake has not malfunctioned 1106 yet, that is, its condition is better than in the case described above, in which the brake was found to have malfunctioned, the method continues to step 1110, in which the condition of the brake is advised to the service centre. The condition of the brake may be advised for example by using a multi-step indicator light system, such as a traffic light-type combination, in which the condition of the brake is indicated with one light or a combination of several lights and/or alternatively on a numerical scale.

The information on the condition of the brake delivered to the service centre may comprise the condition level of the brake. The condition level of the brake may be advised to the service centre as a condition level defined by the monitoring device as described in connection with step 708 of FIG. 7a. This way, the amount of data transferred to the service centre may be kept small, whereby correspondingly the energy amount required by the monitoring device is not large. Depending on the data transmission method the monitoring device uses, the size of the data to be transmitted may also reflect on the costs caused by data transmission, which is why it is preferable to keep the amounts of data as small as possible.

The condition information of the brake advised to the service centre may, instead of the condition level defined by the monitoring device, comprise performance information on the brake, such as times measured from the opening and/or closing of the brake. This way, the service centre may make an estimate on the necessity of brake maintenance on the basis of the information received from the monitoring device, and the data processing capacity in the monitoring device can be kept smaller. Thus, the implementation of the monitoring device can be kept simple and, consequently, its price small.

When an emergency stop has been performed and/or advice given on the brake's condition, the method ends in step 1112.

Figure 12:
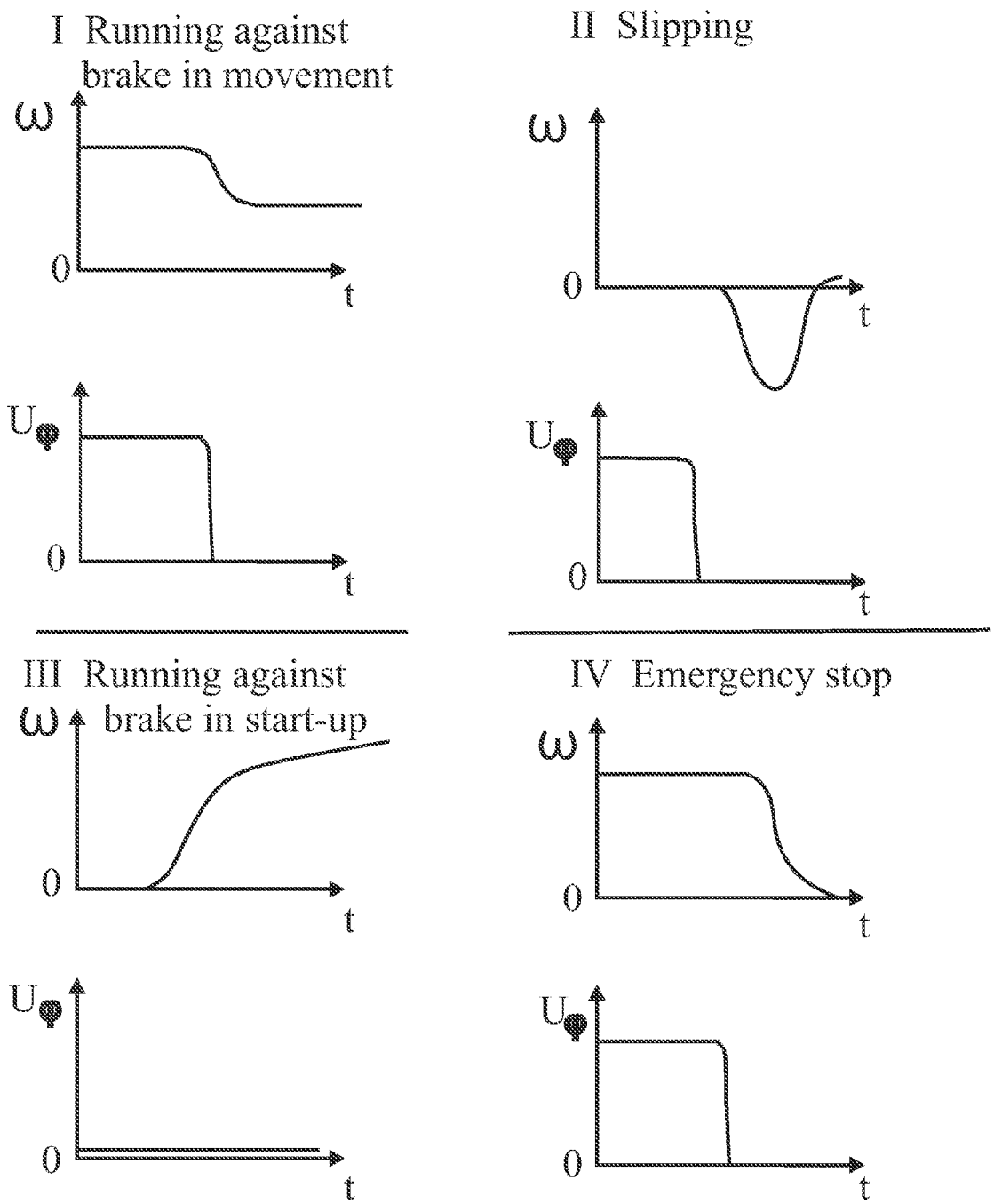
FIG. 12 shows the strength of a magnetic field of a brake and the angular velocity measured from a hoisting device when using the brake in four cases.

FIG. 12 shows the strength $U\phi$ of a magnetic field of a brake and the angular velocity measured from a hoisting device when using the brake. FIG. 12 shows situations I to IV that show the strength of the brake's magnetic field and the angular velocity $\omega$ in each situation. The curves of the different situations in FIG. 12 may be obtained by a device according to the embodiments described above, such as the devices of FIGS. 3a and 3b. FIGS. 2a and 2b illustrate the states of the brake in the different situations of FIG. 12.

Situation I shows running against the brake from movement. The movement is measured by angular velocity $\omega$ that may be measured from the rope drum or motor. When the magnetic field of the brake is switched off and its strength $U\phi$ decreases, the braking surfaces of the brake move into the closed state. With reference to FIG. 12 and situation I, at the moment when the strength of the magnetic field decreases to essentially zero, the angular velocity drops but not to zero. The power of the motor that is transmitted to the power transmission means of the hoisting device may then run against the brake. In such a case, it is also possible that power is transmitted from the hoisting device to the brake through the power transmission means, whereby the hoisting device can be said to run against the brake that is in a closed state, because there is no magnetic field.

Situation II shows the slipping of a brake, when the brake is closed and the strength $U\phi$ of the brake's magnetic field is essentially zero. In situation II, slipping occurs as a result of the power transmitted through the power transmission means of the hoisting device from the load of the hoisting device to the brake, for instance. The power of the brake is then not sufficient to resist the power transmitted from the hoisting device and the brake slips, which may be detected as angular velocity deviating from zero as explained in an earlier description. This may result in the dropping of the load.

Situation III shows running against the brake during the starting of the hoisting device motor. The strength $U\phi$ of the brake's magnetic field is essentially zero, which means there is no magnetic field in the brake and it remains closed. The starting of the hoisting device motor can be detected from the angular velocity $\omega$ measured from the motor. Because the brake has no magnetic field, the brake is closed and the power of the motor is transmitted through the power transmission means to the brake and the motor runs against the brake.

Situation IV shows an emergency stop that is performed when the motor runs the hoisting device through the power transmission means. The strength $U\phi$ of the brake's magnetic field then drops to essentially zero and the brake has no magnetic field and, therefore, closes. As the brake closes, the angular velocity $\omega$ drops to zero under the effect of the brake. After this, it is possible that slipping takes places in the brake, as shown in situation II.

The time sequence of the steps and functions described in FIGS. 6, 7a, 8, 9a, 9b, 10 and 11 is not absolute and some steps and/or functions may be performed simultaneously or in a different order than described. Other functions may also be performed between the described steps and/or functions or they may be included in the described steps and/or functions. Some steps and/or function may also be left out or they may be replaced with a corresponding step and/or function. The functionality of the monitoring device may be implemented in one or more physical or logical unit.

The present invention is applicable to any monitoring device, load handling device, hoisting device, crane, bridge crane, quay crane or any combination of different devices having an electromagnetic disc brake in which the braking surfaces may be in an open or closed state.

Devices, such as monitoring devices, load handling devices, hoisting devices, cranes, bridge cranes, and quay cranes, which implement the functionality of the device according to the embodiments described above comprise not only the prior-art means, but also means for measuring time from the change in the magnetic field caused by the magnetizing means to the transfer of the braking surfaces from one state to the other. In addition, they may comprise means for determining the condition of the brake on the basis of the change in the measured times. More specifically, they may comprise means for implementing the functionality of the device described in any of the embodiments described above, and they may comprise separate means for each separate function, or the means may be arranged to perform two or more functions. Prior-art devices comprise processors and memory that may be utilized for the one or more functionalities described in the embodiments described above. For instance, the monitoring device may comprise an application program or a module or a unit capable of an arithmetic function, or a program (including an added or updated software routine) that may be executed by a processor, for example. Software, which may also be called software products including program routines, applets and macros, may be stored on any data storage medium readable by the device, and they contain program instructions for executing specific tasks. All changes and arrangements that are needed to implement the functionality of the present embodiment may be executed by routines that may be implemented either as added or updated software routines, application-specific circuits (ASIC) and/or programmable circuits, such as FPGA (Field programmable Gate Array) circuits. In addition, software routines may be downloaded into a device according to the described embodiment. The device, such as a monitoring device, may be implemented by a computer or as a microprocessor, such as a one-chip computer element, that contains at least memory to provide a storage area for use in arithmetic operations and a processor for performing arithmetic operations. An example of a processor is a central processing unit (CPU). The memory may be detachably attached to the device.

It will be apparent to a person skilled in the art that as technology advances, the basic idea of the invention may be implemented in many different ways. The invention and its embodiments are thus not restricted to the examples described above but may vary within the scope of the claims.

The invention claimed is:

1. A method for monitoring a brake that comprises:
first and second braking surfaces, and
magnetizing means arranged to move the braking surfaces to an open state, in which the braking surfaces are separated from each other, and to a closed state, in which the braking surfaces are connected to each other, the method comprising:
measuring the time that elapses from the change in the magnetic field caused by the magnetizing means to the shift of the braking surfaces from one state to another;
determining a strength of the brake's magnetic field; and
determining a malfunction of the brake when the magnetizing means generate a magnetic field in the closed state of the braking surfaces.

2. A method as claimed in claim 1, further comprising:
performing several measurements on the time that elapses from the change in the magnetic field caused by the magnetizing means to the shift of the braking surfaces from one state to another; and
determining the condition of the brake on the basis of the change in the times.

3. A method as claimed in claim 1, comprising:
performing several measurements on the time that elapses from the increase in the magnetic field and the shift of the braking surfaces from the closed state to the open state; and
determining the decrease in the condition of the brake when the measured times are increasing.

4. A method as claimed in claim 1, comprising:
performing several measurements on the time from the decrease in the magnetic field of the brake and the shift of the braking surfaces from the open state to the closed state; and
determining the decrease in the condition of the brake when the measured times are decreasing.

5. A method as claimed in claim 1, comprising:
determining a threshold value for the time that elapses from the change in the magnetic field caused by the magnetizing means to the shift of the braking surfaces from one state to another; and
determining a malfunction of the brake when the measured time exceeds the defined threshold value.

6. A method as claimed in claim 1, comprising:
determining the strength of the brake's magnetic field in the open state of the braking surfaces; and
determining a malfunction of the brake, when the magnetic field generated by the magnetizing means is smaller than the determined magnetic field of the brake in the open state of the braking surfaces.

7. A method as claimed in claim 1, wherein the monitored brake comprises a braking surface that is arranged to rotate with the device to be decelerated, the method comprising:
determining a malfunction of the brake when, on the braking surface that is arranged to rotate with the device to be decelerated, an angular velocity deviating from zero is measured and the strength of the magnetic field generated by the magnetizing means is essentially zero.

8. A method as claimed in claim 1, comprising:
advising a service centre of the change in the condition level and/or a malfunction of the brake; and
performing an emergency stop if the brake has a malfunction.

9. A computer program embodied on a non-transitory distribution medium, having program instructions which, when loaded into an apparatus will cause execution of steps of a method as claimed in claim 1 when downloaded into the device.

10. A device for monitoring an electromagnetic brake, the brake comprising first and second braking surfaces being movable between an open state opened by means of a magnetic field of the brake, where the braking surfaces are not connected to each other, and a closed state, where the braking surfaces are connected to each other, the device comprising:
receiving means for receiving energy from the magnetic field of the brake, and the device being arranged:
to measure time from the change in the magnetic field caused by the magnetizing means to the shift of the braking surfaces from one state to another; and
determine a malfunction of the brake when the magnetizing means generate a magnetic field in the closed state of the braking surfaces.

11. A device as claimed in claim 10, the device being arranged:
to perform several measurements on the time that elapses from the change in the magnetic field caused by the magnetizing means to the shift of the braking surfaces from one state to another; and
to determine the condition of the brake on the basis of the change in the times.

12. A device as claimed in claim 10, the device being arranged:
to perform several measurements on the time that elapses from the increase in the magnetic field of the brake and the shift of the braking surfaces from the closed state to the open state; and
to determine the decrease in the condition of the brake when the measured times are increasing.

13. A device as claimed in claim 10, the device being arranged:
to perform several measurements on the time from the decrease in the magnetic field of the brake and the shift of the braking surfaces from the open state to the closed state; and
to determine the decrease in the condition of the brake when the measured times are decreasing.

14. A device as claimed in claim 10, the device being arranged:
to determine a threshold value for the time that elapses from the change in the magnetic field caused by the magnetizing means to the shift of the braking surfaces from one state to another; and
to determine a malfunction of the brake when the measured time exceeds the determined threshold value.

15. A device as claimed in claim 10, the device being arranged:
to define the strength of the brake's magnetic field in the open state of the braking surfaces; and
to determine a malfunction of the brake, when the magnetic field generated by the magnetizing means is smaller than the determined strength of the brake's magnetic field in the open state of the braking surfaces.

16. A device as claimed in claim 10, wherein the monitored brake comprises a braking surface that is arranged to rotate with the device to be decelerated, the device being arranged:
to determine a malfunction of the brake when, on the braking surface that is arranged to rotate with the device to be decelerated, an angular velocity deviating from zero is measured and the strength of the magnetic field generated by the magnetizing means is essentially zero.

17. A device as claimed in claim 10, wherein the receiving means for receiving energy from the magnetic field of the brake comprise a coil or a Hall sensor.

18. A device as claimed in claim 10, wherein the device comprises a pulse sensor or a biaxial acceleration transducer for determining the angular velocity of at least one braking surface.

19. A device as claimed in claim 10, wherein the device comprises an acceleration transducer to determine the shift of the braking surfaces from one state to the other.

20. A device as claimed in claim 10, wherein the condition of the brake comprises the condition of any braking surface.

21. An electromagnetic brake that comprises a device as claimed in claim 10.

22. An electromagnetic brake as claimed in claim 21 and comprising a housing with a recess, into which recess a device for monitoring an electromagnetic brake is installed, the brake comprising first and second braking surfaces being movable between an open state opened by means of a magnetic field of the brake, where the braking surfaces are not connected to each other, and a closed state, where the braking surfaces are connected to each other, the device comprising:
receiving means for receiving energy from the magnetic field of the brake, and the device being arranged:
to measure time from the change in the magnetic field caused by the magnetizing means to the shift of the braking surfaces from one state to another; and
determine a malfunction of the brake when the magnetizing means generate a magnetic field in the closed state of the braking surfaces.

23. A hoisting device that comprises the electromagnetic brake as claimed in claim 22.

24. A hoisting device as claimed in claim 23 and comprising a rope drum that is functionally connected to at least one braking surface of said electromagnetic brake, whereby both are arranged to rotate when load is lifted or lowered, and a multiaxis acceleration transducer that is arranged at the rope drum to measure the angular velocity of the rope drum.

25. A hoisting device as claimed in claim 24 and comprising at least one of the following: quay crane and bridge crane.

26. A method for upgrading a hoisting device, the device comprising an electromagnetic brake with first and second braking surfaces being movable between an open state opened by means of a magnetic field of the brake, where the braking surfaces are not connected to each other, and a closed state, where the braking surfaces are connected to each other, the method comprising:
installing the device of claim 10 in connection with an electromagnetic brake.

27. A device for executing a method for monitoring a brake that comprises:
first and second braking surfaces, and
magnetizing means arranged to move the braking surfaces to an open state, in which the braking surfaces are separated from each other, and to a closed state, in which the braking surfaces are connected to each other, the device comprising:
means for measuring the time that elapses from the change in the magnetic field caused by the magnetizing means to the shift of the braking surfaces from one state to another;
means for determining a strength of the brake's magnetic field; and
means for determining a malfunction of the brake when the magnetizing means generate a magnetic field in the closed state of the braking surfaces.

* * * * *